United States Patent
Hsu et al.

(10) Patent No.: US 11,113,376 B2
(45) Date of Patent: *Sep. 7, 2021

(54) DETECTION SYSTEM, FINGERPRINT SENSOR, AND METHOD OF FINGER TOUCH AUTHENTICATION THEREOF

(71) Applicant: NOVATEK Microelectronics Corp., Hsin-Chu (TW)

(72) Inventors: Sheng-Ruei Hsu, Hsinchu (TW); Chi-Ting Chen, Hsinchu (TW)

(73) Assignee: NOVATEK Microelectronics Corp., Hsin-Chu (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/907,117

(22) Filed: Jun. 19, 2020

(65) Prior Publication Data

US 2020/0320185 A1 Oct. 8, 2020

Related U.S. Application Data

(63) Continuation of application No. 15/436,875, filed on Feb. 20, 2017, now Pat. No. 10,762,182.

(51) Int. Cl.
*G06F 21/32* (2013.01)
*G06F 3/0488* (2013.01)
*G06K 9/00* (2006.01)

(52) U.S. Cl.
CPC ........... *G06F 21/32* (2013.01); *G06F 3/0488* (2013.01); *G06K 9/00087* (2013.01); *G06F 2203/04104* (2013.01)

(58) Field of Classification Search
CPC .............. G06F 21/32; G06F 3/0488; G06F 2203/04104
See application file for complete search history.

(56) References Cited

U.S. PATENT DOCUMENTS

| | | | | |
|---|---|---|---|---|
| 5,719,950 | A * | 2/1998 | Osten | H04L 63/0861 382/115 |
| 2012/0174214 | A1* | 7/2012 | Huang | G06F 21/32 726/19 |
| 2015/0213244 | A1* | 7/2015 | Lymberopoulos | H04L 63/0861 726/18 |
| 2016/0078210 | A1 | 3/2016 | Lymberopoulos | |
| 2016/0283703 | A1* | 9/2016 | Allyn | G06F 21/32 |

FOREIGN PATENT DOCUMENTS

| | | |
|---|---|---|
| CN | 101604550 A | 12/2009 |
| CN | 102713887 A | 10/2012 |
| CN | 104765994 A | 7/2015 |
| CN | 105980973 A | 9/2016 |

* cited by examiner

*Primary Examiner* — Ali S Abyaneh
(74) *Attorney, Agent, or Firm* — Winston Hsu

(57) ABSTRACT

The present invention discloses a method of finger touch authentication through a fingerprint sensor. The method includes obtaining a plurality of touch operations through the fingerprint sensor, detecting a pattern of the plurality of touch operations; comparing the pattern with a registered pattern to generate a comparison result, and authenticating the plurality of touch operations on the basis of the comparison result, wherein the pattern indicates at least one feature, and the fingerprint sensor is capable of authenticating a fingerprint of a user after or before the finger touch authentication.

36 Claims, 7 Drawing Sheets

DETECTION SYSTEM, FINGERPRINT SENSOR, AND METHOD OF FINGER TOUCH AUTHENTICATION THEREOF

CROSS REFERENCE TO RELATED APPLICATIONS

This is a continuation-in-part application of U.S. application Ser. No. 15/436,875, filed Feb. 20, 2017, which is included in its entirety herein by reference.

BACKGROUND OF THE INVENTION

1. Field of the Invention

The present invention relates to a detection system, fingerprint sensor and method of finger touch authentication thereof, and more particularly, to a detection system, fingerprint sensor and method of finger touch authentication capable of detecting finger touch operations and fingerprints through the same fingerprint sensor.

2. Description of the Prior Art

With advances in information and communication technologies, an electronic device may store user's private data such as messages, photos or emails, and the user may not be willing to allow the private data to be seen by other people. On the other hand, online shopping over the Internet has become a common part of life, the user may be required to perform an electronic payment procedure to approve a shopping order through the electronic device.

FIG. 1A illustrates a security code input interface of an electronic device 1A. FIG. 1B illustrates a graphic security code input interface of an electronic device 1B.

In FIG. 1A, the user enters a security code or a password through a security code input interface (e.g., a touch screen SCN1 of the electronic device 1A) to unlock the operating system of the electronic device 1A. Or, the user inputs a Personal Identification Number (PIN) code corresponding to a credit card or a bank account to the corresponding web server through the security code input interface to approve a shopping order.

In FIG. 1B, the user draws a graphic security code or a graphic password through a security code input interface (e.g., a touch screen SCN2 of the electronic device 1B) to unlock the operating system of the electronic device 1B.

However, the security code of the user may be hacked by other people when using the touch screen as the security code input interface by simply watching the user entering the security code on the touch screen.

In order to prevent such hacking, how to improve security and confidentiality of the electronic device has become one of the topics to be solved in the industry.

SUMMARY OF THE INVENTION

It is therefore an objective of the present invention to provide a detection system, fingerprint sensor and method of finger touch authentication capable of detecting finger touch operations and fingerprint through the same fingerprint sensor.

The present invention discloses a method of finger touch authentication through a fingerprint sensor. The method includes obtaining a plurality of touch operations through the fingerprint sensor, detecting a pattern of the plurality of touch operations; comparing the pattern with a registered pattern to generate a comparison result, and authenticating the plurality of touch operations on the basis of the comparison result, wherein the pattern indicates at least one feature, and the fingerprint sensor is capable of authenticating a fingerprint of a user after or before the finger touch authentication.

The present invention further discloses a detection system capable of user authentication. The detection system includes a fingerprint sensor, a processing device, and a memory device. The fingerprint sensor is used for detecting a plurality of touch operations. The processing device is coupled to the fingerprint sensor. The memory device is coupled to the processing device, for storing a program code to instruct the processing device to execute a process of finger touch authentication to perform the method of finger touch authentication through the fingerprint sensor.

The present invention further discloses a fingerprint sensor capable of user authentication. The fingerprint sensor includes a fingerprint sensing array, a processing device and a memory device. The fingerprint sensing array is used for detecting a plurality of touch operations. The processing device is coupled to the fingerprint sensing array. The memory device is coupled to the processing device, for storing a program code to instruct the processing device to execute a process of finger touch authentication to perform the method of finger touch authentication through the fingerprint sensor.

The present invention utilizes the same fingerprint sensor to detect touch operations and fingerprint of the user to provide two steps of user account authentication (i.e., the finger touch and authentication and the fingerprint authentication), which enhances security and confidentiality of the electronic device. In addition, the fingerprint sensor may be integrated into a function key (e.g., home button) of the electronic device, which simplifies a hardware design of the electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
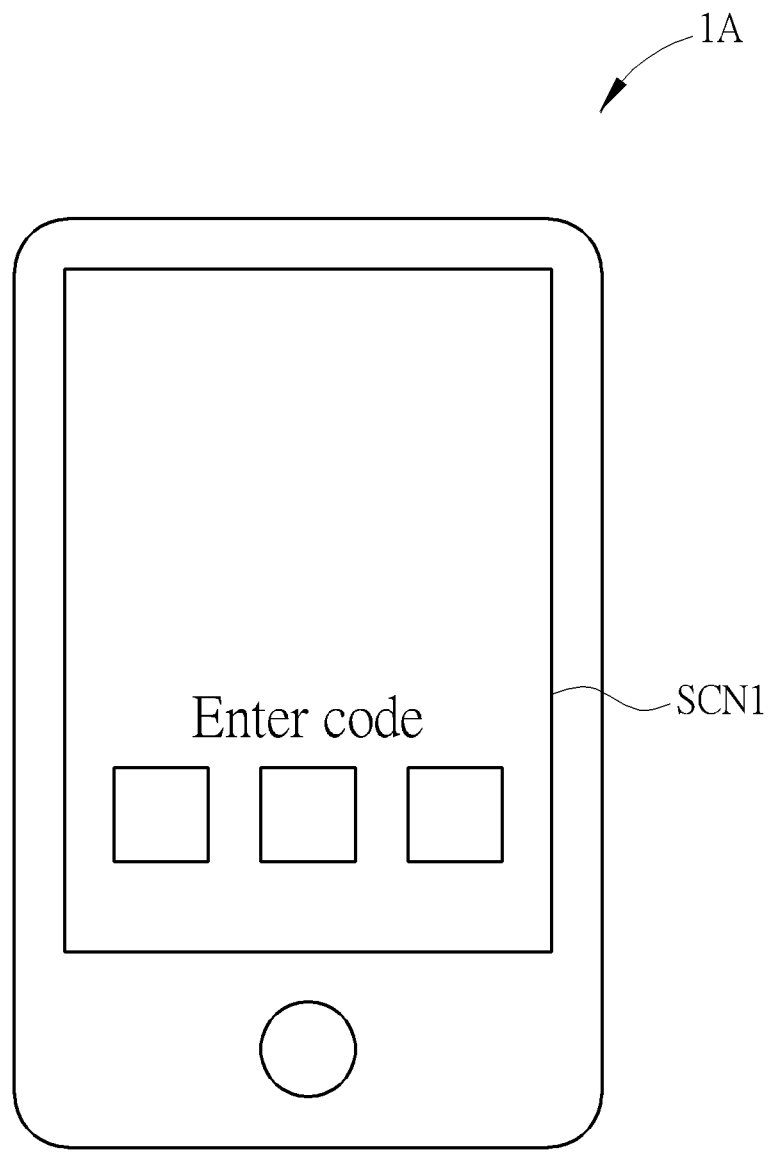
FIG. 1A illustrates a security code input interface of an electronic device.
Figure 1B:
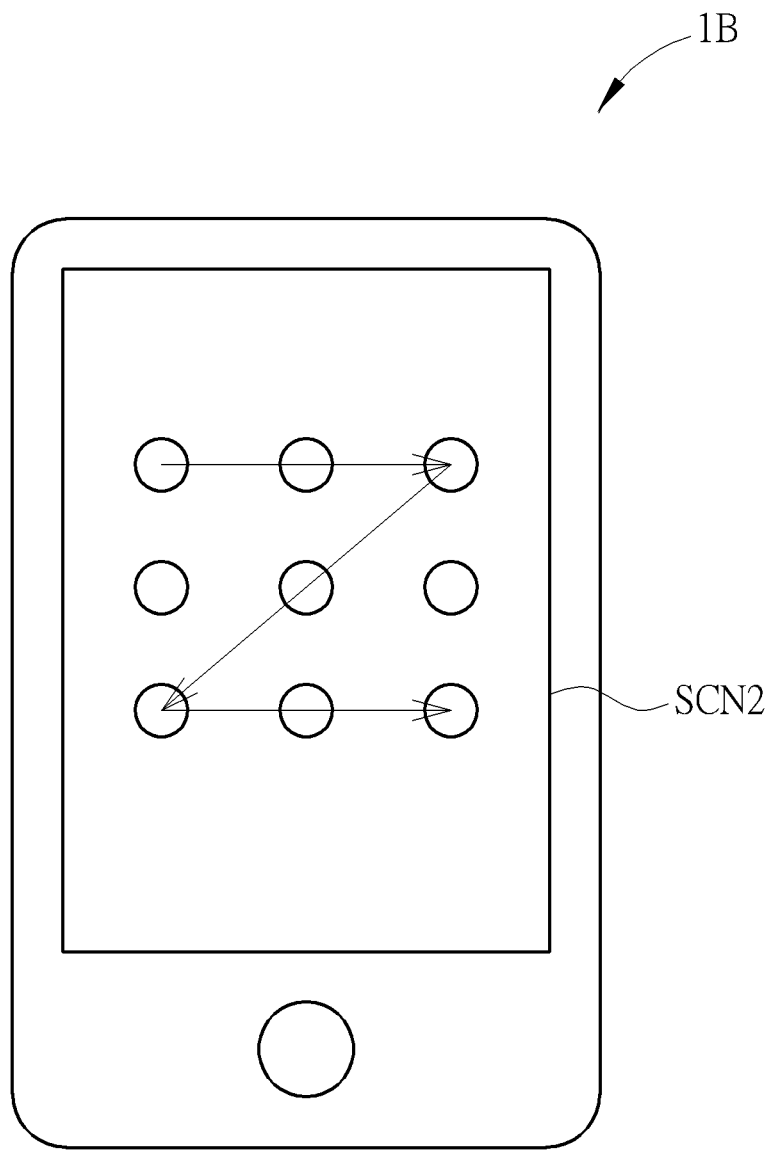
FIG. 1B illustrates another security code input interface of an electronic device.
Figure 2:
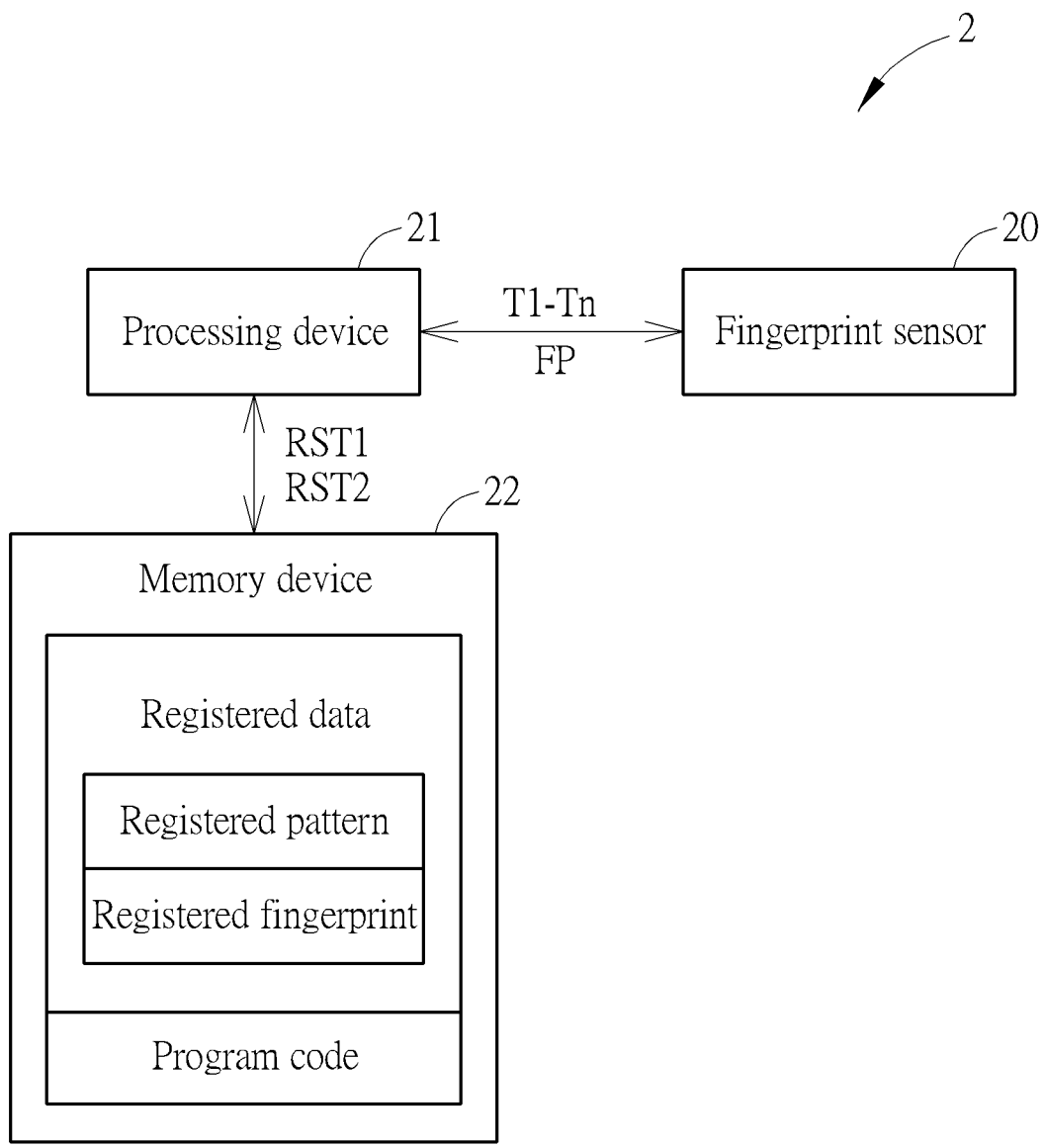
FIG. 2 is a functional block diagram of a detection system according to an embodiment of the present invention.

FIG. 2 is a functional block diagram of a detection system 2 according to an embodiment of the present invention. The detection system 2 includes a fingerprint sensor 20, a processing device 21, and a memory device 22. The detection system 2 may be an electronic device, such as a smart phone, a laptop, a tablet computer, a desktop computer, and so on. In one embodiment, the detection system 2 may be a functional module to be integrated into the electronic device.

The fingerprint sensor 20 is coupled to the processing device 21 for detecting a plurality of touch operations T1-Tn and a fingerprint FP of a user. The processing device 21 is coupled to the fingerprint sensor 20 and the memory device 22, for executing a process of finger touch authentication according to the plurality of touch operations T1-Tn to generate a comparison result RST1. Then, the processing device 21 authenticates the plurality of touch operations T1-Tn on the basis of the comparison result RST1.

In one embodiment, the processing device 21 further authenticates the fingerprint FP of the user to generate a comparison result RST2. Alternatively, the fingerprint sensor 20 is capable of authenticating the fingerprint FP of the user to generate the comparison result RST2 after or before the finger touch authentication performed by the processing device 21.

The memory device 22 is coupled to the processing device 21 for storing a program code, wherein the program code instructs the processing device 21 to perform finger touch authentication. The memory device 22 further stores registered data of the user, such as a registered pattern and a registered fingerprint. The pattern of the plurality of touch operations T1-Tn and the registered pattern indicate at least one feature, wherein the pattern of the plurality of touch operations T1-Tn may be regarded as a security code or password of a user account. For example, if the comparison result RST1 indicates that the pattern of the plurality of touch operations T1-Tn matches with the registered pattern, and the comparison result RST2 indicates that the fingerprint FP matches with the registered fingerprint, an operating system of the electronic device can be unlocked or a mobile payment service can be approved.

Therefore, the detection system 2 provides two steps of user account authentication (i.e., the finger touch authentication and the fingerprint authentication), which enhances security and confidentiality of the electronic device. In addition, the plurality of touch operations T1-Tn and the fingerprint FP are detected by the same fingerprint sensor 20, and the fingerprint sensor 20 may be integrated into a function key (e.g., home button) of the electronic device, which simplifies a hardware design of the electronic device.

Figure 3:
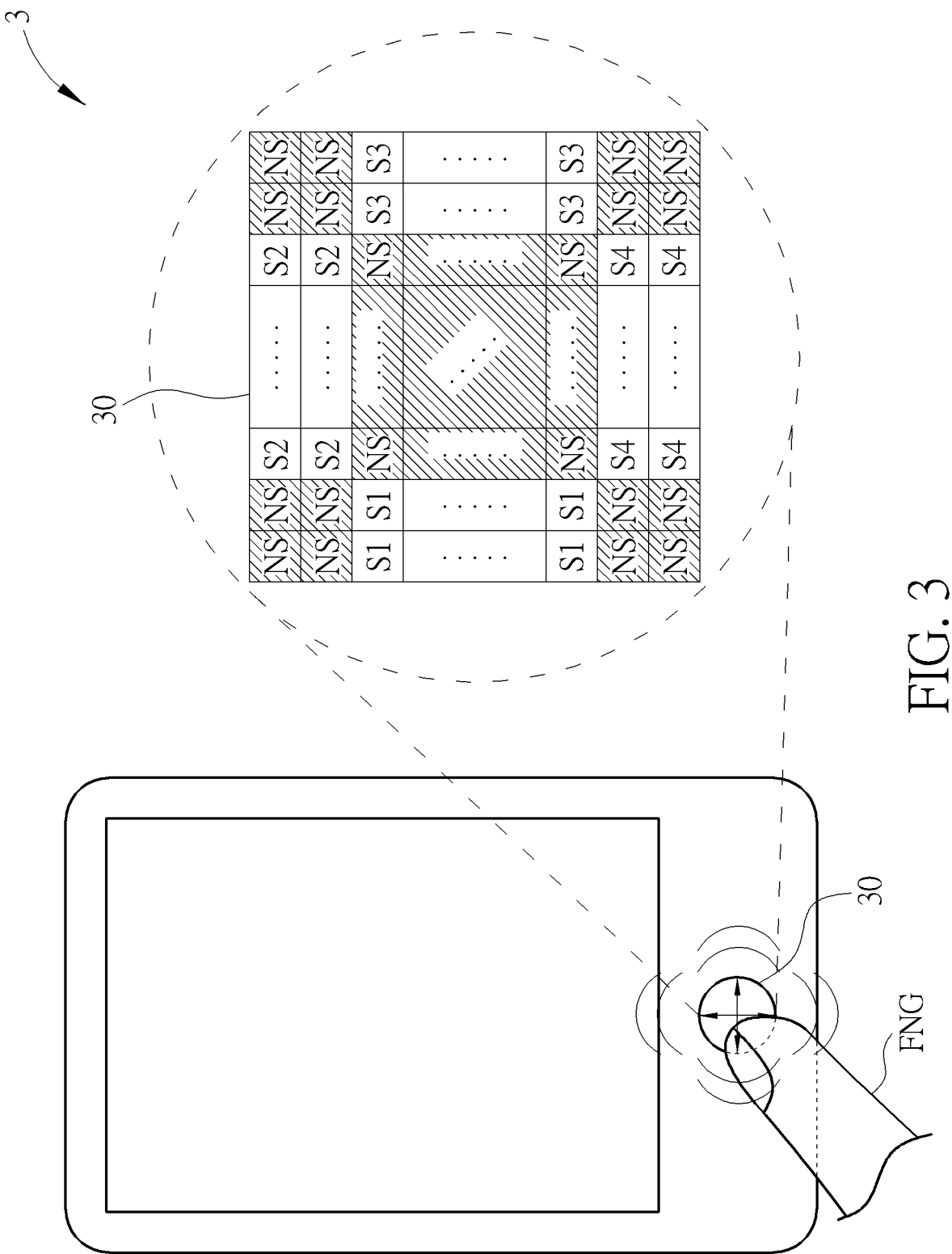
FIG. 3 is a schematic diagram of a detection system according to an embodiment of the present invention.

FIG. 3 is a schematic diagram of a detection system 3 according to an embodiment of the present invention. A fingerprint sensor 30 of the detection system 3 is integrated into a home button of the electronic device. The user can wake up the detection system 3 by pressing the home button to perform the finger touch authentication and the fingerprint authentication through the same fingerprint sensor 30. In the embodiment of FIG. 3, the at least one feature of the pattern comprises a number of the plurality of touch operations and a plurality of touch locations corresponding to the plurality of touch operations.

The fingerprint sensor 30 includes a sensor array 30 with a plurality of configurable cells (e.g., M*N cells), for example, the configurable cell can be configured to be either a sensing cell or a non-sensing cell, and each of the configurable cells is corresponding to a unique coordinate. The fingerprint sensor 30 is preferably a capacitive fingerprint sensor. For one touch operation, when a finger FNG of the user is touching on the sensor array 30, each of the sensing cells independently detects induced capacitance variance caused by the finger FNG. The processing device (not shown) of the detection system 3 compares the induced capacitance variance with a reference value, to determine whether the induced capacitance variance is significant, less significant or insignificant. Then, the processing device obtains the coordinate (s) of the sensing cell (s) which generates the significant induced capacitance variance(s), to recognize the touch location corresponding to the touch operation. On the other hand, the processing device ignores the insignificant induced capacitance variance(s). Once all the touch locations corresponding to the plurality of touch operations T1-Tn are recognized, the pattern of the plurality of touch operations T1-Tn can be detected.

For example, as shown in FIG. 3, the sensor array 30 is configured with a plurality of sensing cells S1, S2, S3 and S4 and a plurality of non-sensing cells NS. The plurality of sensing cells S1, S2, S3 and S4 is respectively corresponding to a plurality of touch locations, e.g., up, down, left and right locations. In preparation of the finger touch authentication, the user may set a registered pattern with left, left, down, down, up, up, right, and right locations, wherein the registered pattern indicates a feature of eight touch operations and four touch locations corresponding to the eight touch operations.

When performing the finger touch authentication, the user may place the finger FNG onto the home button, and then press one of the touch locations on the home button at one time, so the sensing cells S1, S2, S3 and S4 detect induced capacitance variances caused by the finger FNG. The processing device determines that the touch location corresponding to a touch operation is the left location if the induced capacitance variances detected by the sensing cells S1 are the most significant, and the induced capacitance variances detected by the sensing cells S2, S3 and S4 are less significant or insignificant. Similarly, the processing device determines that the touch location corresponding to a touch operation is the up, right or down location if the induced capacitance variances detected by the sensing cells S2, S3 or S4 are the most significant.

Once the user finishes the plurality of touch operations T1-Tn, the processing device calculates the number of the plurality of touch operations T1-Tn and the touch locations corresponding to the plurality of touch operations T1-Tn, so as to detect the pattern of the plurality of touch operations T1-Tn. Then, the processing device compares the pattern of the plurality of touch operations T1-Tn with the registered pattern to generate the comparison result RST1, thereby authenticating the plurality of touch operations T1-Tn on the basis of the comparison result RST1. For example, the plurality of touch operations T1-Tn is authenticated if its pattern matches with the registered pattern which indicates the feature of eight touch operations and four touch locations corresponding to the eight touch operations.

Figure 4:
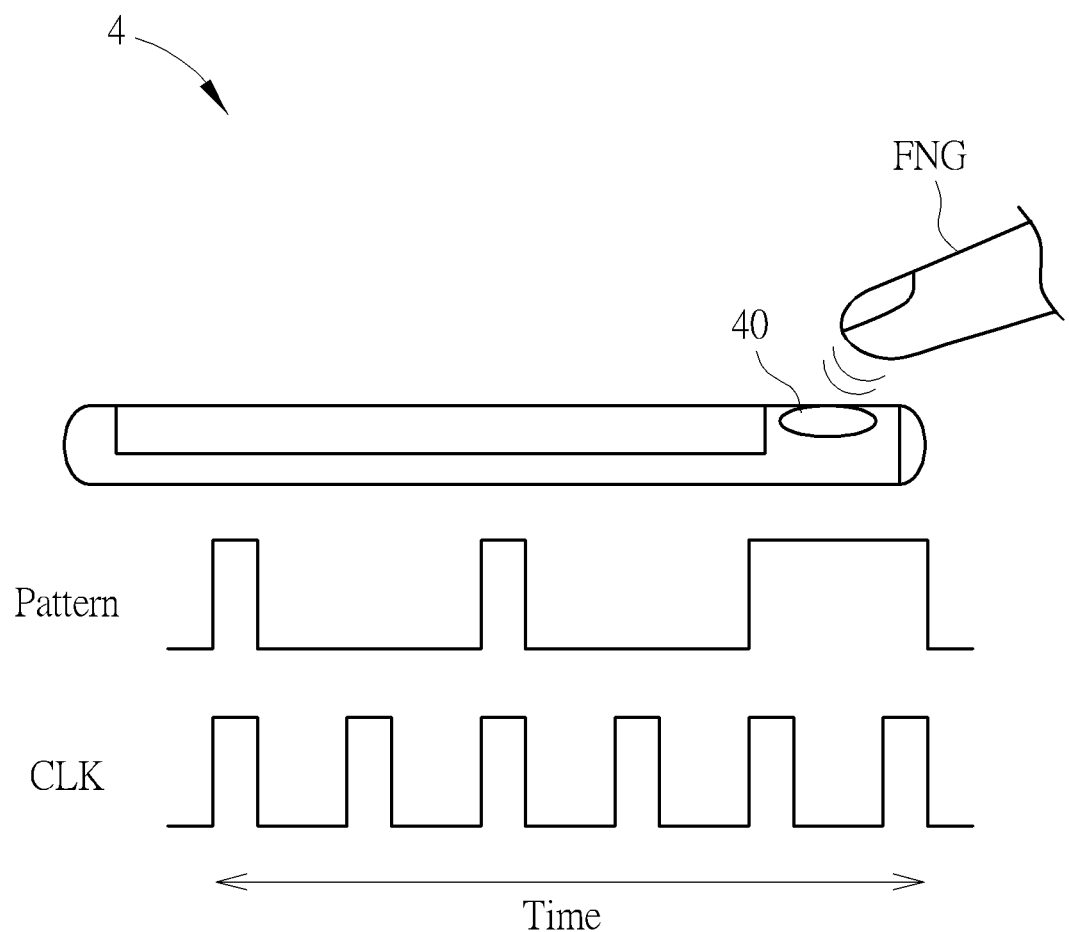
FIG. 4 is a schematic diagram of a detection system according to another embodiment of the present invention.

FIG. 4 is a schematic diagram of a detection system 4 according to another embodiment of the present invention. A fingerprint sensor 40 of the detection system 4 is integrated into a home button of the electronic device. In the embodiment of FIG. 4, the at least one feature comprises a number of a plurality of touch operations and a plurality of touch durations corresponding to the plurality of touch operations.

The fingerprint sensor 40 is preferably a capacitive or optical fingerprint sensor. When the finger FNG of the user is touching on the fingerprint sensor 40, the fingerprint sensor 40 internally generates a clock signal CLK for counting a duration of the touch operation. The processing device (not shown) of the detection system 4 compares the duration with a reference duration, to determine whether the duration is either a long touch operation or a short touch operation, to recognize the touch duration corresponding to the touch operation. Once all the touch durations corresponding to the plurality of touch operations T1-Tn are recognized, the pattern of the plurality of touch operations T1-Tn can be detected.

For example, in preparation of the finger touch authentication, the user may set a registered pattern with short, short, and long durations, wherein the registered pattern indicates a feature of three touch operations, two short durations and one long duration corresponding to the three touch operations.

When performing the finger touch authentication, the user may touch on the home button with short or long duration, so the fingerprint sensor 40 generates the clock signal CLK for counting the duration of each touch operation. The processing device of the detection system 4 compares the duration with a reference duration, to determine whether the duration is either a long touch operation or a short touch operation, to recognize the touch duration corresponding to one of the plurality of touch operations T1-Tn.

Once the user finishes the plurality of touch operations T1-Tn, the processing device calculates the number of the plurality of touch operations T1-Tn and the touch durations corresponding to the plurality of touch operations T1-Tn, so as to detect the pattern of the plurality of touch operations T1-Tn. Then, the processing device compares the pattern of the plurality of touch operations T1-Tn with the registered pattern to generate the comparison result RST1, thereby authenticating the plurality of touch operations T1-Tn on the basis of the comparison result RST1. For example, the plurality of touch operations T1-Tn is authenticated if its pattern matches with the registered pattern which indicates the feature of three touch operations, two short touch durations and one long touch duration corresponding to the three touch operations.

Figure 5:
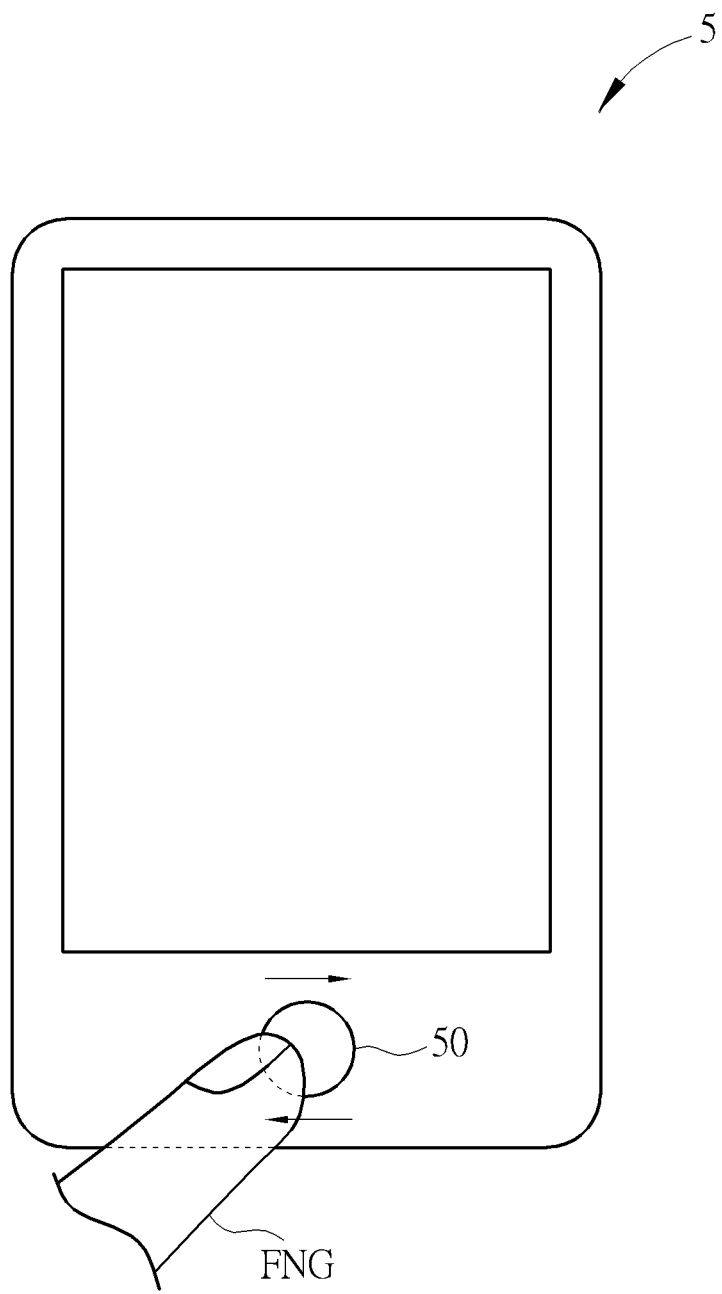
FIG. 5 is a schematic diagram of a detection system according to another embodiment of the present invention.

FIG. 5 is a schematic diagram of a detection system 5 according to another embodiment of the present invention. A fingerprint sensor 50 of the detection system 5 is integrated into a home button of the electronic device. In the embodiment of FIG. 5, the at least one feature comprises a plurality of slide directions corresponding to a plurality of slide operations and a number of slide direction change between two of the plurality of slide operations.

The fingerprint sensor 50 includes a sensor array (not shown) with a plurality of configurable cells (e.g., M*N cells), for example, the configurable cell can be configured to be either a sensing cell or a non-sensing cell, and each of the configurable cells is corresponding to a unique coordinate. The fingerprint sensor 50 is preferably a capacitive fingerprint sensor. For one touch (slide) operation, when a finger FNG of the user is sliding over the sensor array, each of the sensing cells independently detects induced capacitance variance caused by the finger FNG, and the fingerprint sensor 50 internally generates a clock signal for counting a duration of the slide operation. Based on the coordinates of the sensing cells which had detected the finger FNG and the duration of the slide operation, the processing device (not shown) of the detection system 5 calculates a speed and a slide direction corresponding to the slide operation. The processing device of the detection system 5 further compares the slide speed with a reference speed, to determine whether the slide speed is significant or not. Then, the processing device obtains the slide direction(s) corresponding to the significant slide speed(s), to obtain a slide direction change between two of the plurality of slide operations. On the other hand, the processing device ignores the insignificant slide speed (or slide operation). Once all the touch directions corresponding to the plurality of touch operations T1-Tn are recognized and the number of slide direction change between two of the plurality of slide operations T1-Tn is obtained, the pattern of the plurality of touch operations T1-Tn can be detected.

For example, in preparation of the finger touch authentication, the user may set a registered pattern with right, right, and left directions, wherein the registered pattern indicates a feature of three slide operations, two right directions, one left direction, and one slide direction change corresponding to the three touch operations. In various embodiments, the slide direction may be a direction with arbitrary angles such as an up direction with zero degree, a down direction with 180 degrees, an up-right direction with 45 degrees, a down-left direction with 225 degrees, and so on.

When performing the finger touch authentication, the user may slide over the home button with left or right direction, so the fingerprint sensor 50 generates the clock signal for counting the duration of the slide operation. The processing device of the detection system 5 calculates the speed and direction of the significant slide operation, to determine whether the slide operation is either a right slide operation or a left slide operation, to recognize the slide direction change between two touch operations of the plurality of touch operations T1-Tn.

Once the user finishes the plurality of touch operations T1-Tn, the processing device detects the plurality of slide directions corresponding to the plurality of touch operations T1-Tn and the number of slide direction change between two of the plurality of touch operations T1-Tn, so as to detect the pattern of the plurality of touch operations T1-Tn. Then, the processing device compares the pattern of the plurality of touch operations T1-Tn with the registered pattern to generate the comparison result RST1, thereby authenticating the plurality of touch operations T1-Tn on the basis of the comparison result RST1. For example, the plurality of touch operations T1-Tn is authenticated if its pattern matches with the registered pattern which indicates the feature of three slide operations, two right slide operations, one left slide operation, and one slide direction change corresponding to the three slide operations.

Figure 6:
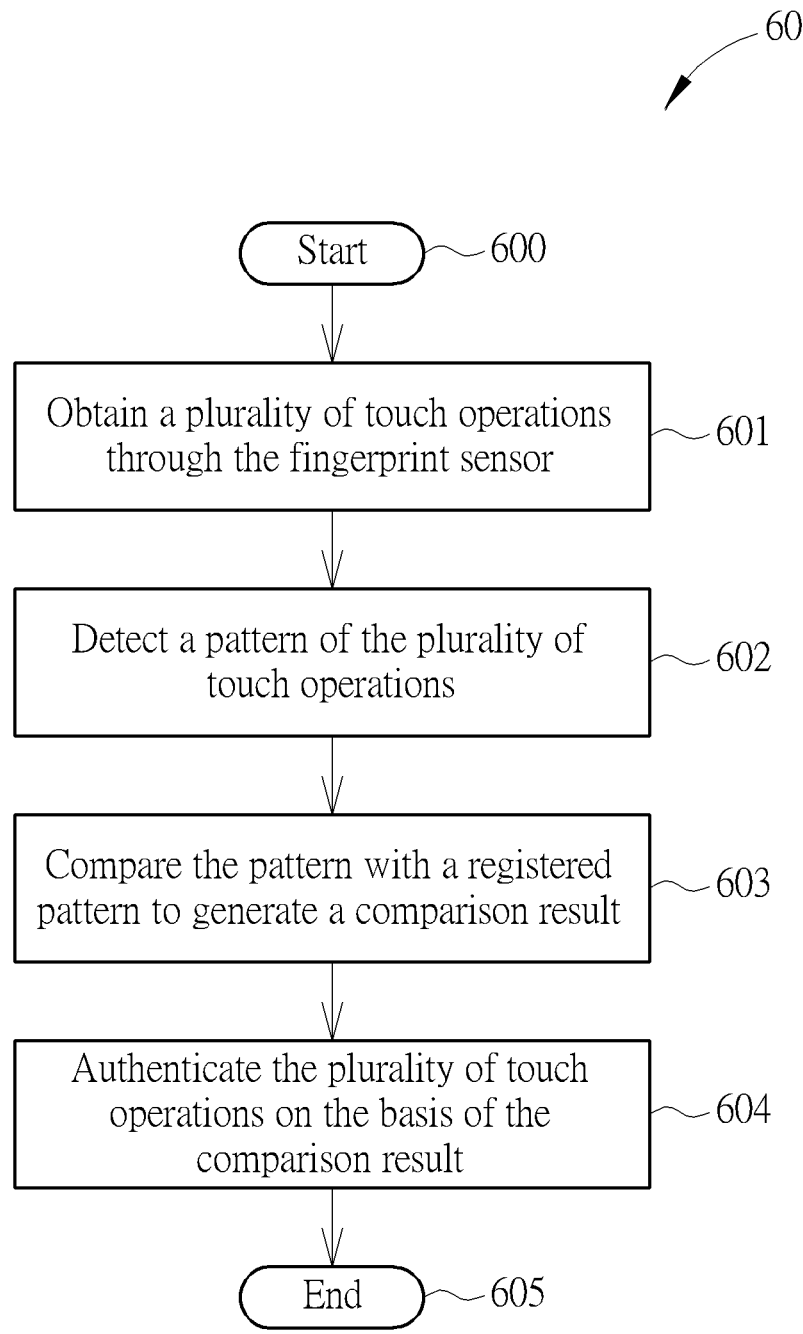
FIG. 6 is a flowchart of a process of finger touch authentication according to an embodiment of the present invention.

FIG. 6 is a flowchart of a process 60 of finger touch authentication according to an embodiment of the present invention. The process 60 can be compiled into a program code stored in the memory device 22 to instruct the processing device 21 to perform finger touch authentication. The process 60 includes the following steps.

Step 600: Start.
Step 601: Obtain a plurality of touch operations through the fingerprint sensor.
Step 602: Detect a pattern of the plurality of touch operations.
Step 603: Compare the pattern with a registered pattern to generate a comparison result.
Step 604: Authenticate the plurality of touch operations on the basis of the comparison result.
Step 605: End.

According to the process 60, the processing device obtains the plurality of touch operations T1-Tn through the fingerprint sensor (Step 601), detects the pattern of the plurality of touch operations T1-Tn (Step 602), and compares the pattern of the plurality of touch operations T1-Tn with the registered pattern to generate the comparison result RST1. Accordingly, the processing device 21 authenticates the plurality of touch operations T1-Tn on the basis of the comparison result RST1. Detailed operations can be obtained by referring to descriptions regarding FIG. 3 to FIG. 5.

It is noted although the embodiments disclosed above use fingerprint sensor having a fingerprint array for explanation, any types of integrated sensors capable of sensing or detecting fingerprints and touch operation may be utilized also. For example, the fingerprint sensor can be implemented as a touch display panel with a fingerprint sensor which can be implemented as in-display, under display or on display structure, and capable of displaying images, sensing touch operations and fingerprints. The sensing areas for the touch operation and/or the fingerprints can be a whole or a part of a display region of the display panel.

In addition, controlling the electronic device according to both the touch comparison result and the fingerprint comparison result can be any types of operation, not limited to determining whether to authenticate the user. Any determination or controlling operation can be performed based on both of the touch comparison result and the fingerprint comparison result. For example, the controlling or operation performed based on two comparison results can be performed after the user is authenticated. Similarly, a specific operation can be performed only when the two comparisons have positive results and cannot be performed when either of the two comparisons has a negative result. A more integrated and efficient operation can therefore be achieved in hardware and software.

To sum up, the embodiments of the present invention can utilize the same fingerprint sensor to detect touch operations and fingerprint of the user to provide two steps of user account authentication (i.e., the finger touch and authentication and the fingerprint authentication), which enhances security and confidentiality of the electronic device. In addition, the fingerprint sensor may be integrated into a function key (e.g., home button) of the electronic device, which simplifies a hardware design of the electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of finger touch authentication for an electronic device comprising a fingerprint sensor comprising a fingerprint sensing array and a processing device coupled to the fingerprint sensing array of the fingerprint sensor and a memory device for storing a program code for instructing the processing device to perform finger touch authentication and for storing registered data of a user, the registered data comprising a registered pattern and a registered fingerprint, the method comprising configuring the processing device according to the program code stored in the memory device to perform the following steps:

obtaining a fingerprint of the user sensed by the fingerprint sensing array of the fingerprint sensor;

obtaining a plurality of touch operations sensed by the fingerprint sensing array of the fingerprint sensor when the fingerprint is sensed by the fingerprint sensing array;

obtaining a pattern of the plurality of touch operations;

comparing the fingerprint with the registered fingerprint stored in the memory device to generate a first comparison result;

comparing the pattern with the registered pattern stored in the memory device to generate a second comparison result; and controlling an electronic device to perform a corresponding operation according to both the first comparison result and the second comparison result.

2. The method of claim 1, wherein the corresponding operation comprises determining whether to authenticate the user.

3. The method of claim 2, wherein the corresponding operation further comprises unlocking an operating system of an electronic device or approving an application service when the user is authenticated.

4. The method of claim 2, wherein the step of determining whether to authenticate the user according to both the first comparison result and the second comparison result comprises:

when the second comparison result indicates that the pattern of the plurality of touch operations matches with the registered pattern, and the first comparison result indicates that the fingerprint matches with the registered fingerprint, the user is determined to be authenticated.

5. The method of claim 4, wherein the step of determining whether to authenticate the user according to both the first comparison result and the second comparison result comprises:

when the second comparison result indicates that the pattern of the plurality of touch operations does not match with the registered pattern, and the first comparison result indicates that the fingerprint does not match with the registered fingerprint, the user is determined not to be authenticated.

6. The method of claim 4, wherein the step of determining whether to authenticate the user according to both the first comparison result and the second comparison result comprises:

when the second comparison result indicates that the pattern of the plurality of touch operations does not match with the registered pattern, and the first comparison result indicates that the fingerprint matches with the registered fingerprint, the user is determined not to be authenticated.

7. The method of claim 4, wherein the step of determining whether to authenticate the user according to both the first comparison result and the second comparison result comprises:

when the second comparison result indicates that the pattern of the plurality of touch operations matches with the registered pattern, and the first comparison result indicates that the fingerprint does not match with the registered fingerprint, the user is determined not to be authenticated.

8. The method of claim 1, wherein the pattern indicates at least one feature, and the at least one feature comprises a number of the plurality of touch operations and at least one of a plurality of touch locations and a plurality of durations corresponding to the plurality of touch operations.

9. The method of claim 1, wherein the at least one feature further comprises a plurality of slide directions corresponding to a plurality of slide operations and a number of slide direction change between two of the plurality of slide operations.

10. A detection system capable of user authentication comprising:

a fingerprint sensor comprising a fingerprint sensing array for detecting a plurality of touch operations;

a processing device coupled to the sensing array of the fingerprint sensor; and a memory device coupled to the processing device, for storing a program code to instruct the processing device to execute a process of finger touch authentication and for storing registered data of a user, the registered data comprising a registered pattern and a registered fingerprint, wherein the process comprises:

obtaining a fingerprint of the user sensed by the fingerprint sensing array of the fingerprint sensor;

obtaining a plurality of touch operations sensed by the fingerprint sensing array of the fingerprint sensor when the fingerprint is sensed by the fingerprint sensing array;

obtaining a pattern of the plurality of touch operations;

comparing the finger print with the registered fingerprint stored in the memory device to generate a first comparison result;

comparing the pattern with the registered pattern stored in the memory device to generate a second comparison result; and controlling an electronic device to perform a corresponding operation according to both the first comparison result and the second comparison result.

11. The detection system of claim 10, wherein the corresponding operation comprises determining whether to authenticate the user.

12. The detection system of claim 11, wherein the corresponding operation further comprises unlocking an operating system of an electronic device or approving an application service when the user is authenticated.

13. The detection system of claim 11, wherein the step of determining whether to authenticate the user according to both the first comparison result and the second comparison result comprises:

when the second comparison result indicates that the pattern of the plurality of touch operations matches with the registered pattern, and the first comparison result indicates that the fingerprint matches with the registered fingerprint, the user is determined to be authenticated.

14. The detection system of claim 13, wherein the step of determining whether to authenticate the user according to both the first comparison result and the second comparison result comprises:

when the second comparison result indicates that the pattern of the plurality of touch operations does not match with the registered pattern, or the first comparison result indicates that the fingerprint does not match with the registered fingerprint, the user is determined not to be authenticated.

15. The detection system of claim 13, wherein the step of determining whether to authenticate the user according to both the first comparison result and the second comparison result comprises:

when the second comparison result indicates that the pattern of the plurality of touch operations does not match with the registered pattern, and the first comparison result indicates that the fingerprint matches with the registered fingerprint, the user is determined not to be authenticated.

16. The detection system of claim 13, wherein the step of determining whether to authenticate the user according to both the first comparison result and the second comparison result comprises:

when the second comparison result indicates that the pattern of the plurality of touch operations matches with the registered pattern, and the first comparison result indicates that the fingerprint does not match with the registered fingerprint, the user is determined not to be authenticated.

17. The detection system of claim 10, wherein the pattern indicates at least one feature, and the at least one feature comprises a number of the plurality of touch operations and at least one of a plurality of touch locations and a plurality of durations corresponding to the plurality of touch operations.

18. The detection system of claim 10, wherein the at least one feature further comprises a plurality of slide directions corresponding to a plurality of slide operations and a number of slide direction change between two of the plurality of slide operations.

19. A fingerprint sensor capable of user authentication comprising:

a fingerprint sensing array configured to sense a plurality of touch operations and a fingerprint;

a processing device coupled to the fingerprint sensing array; and a memory device coupled to the processing device, for storing a program code to instruct the processing device to execute a process of finger touch authentication and for storing registered data of a user, the registered data comprising a registered pattern and a registered fingerprint, wherein the process comprises:

obtaining a fingerprint of the user sensed by the fingerprint sensing array of the fingerprint sensor;

obtaining a plurality of touch operations sensed by the fingerprint sensing array of the fingerprint sensor when the fingerprint is sensed by the fingerprint sensing array;

obtaining a pattern of the plurality of touch operations;

comparing the fingerprint with the registered fingerprint stored in the memory device to generate a first comparison result;

comparing the pattern with the registered pattern stored in the memory device to generate a second comparison result; and controlling an electronic device to perform a corresponding operation according to both the first comparison result and the second comparison result.

20. The fingerprint sensor of claim 19, wherein the corresponding operation comprises determining whether to authenticate the user.

21. The fingerprint sensor of claim 20, wherein the corresponding operation further comprises unlocking an operating system of an electronic device or approving an application service when the user is authenticated.

22. The fingerprint sensor of claim 20, wherein the step of determining whether to authenticate the user according to both the first comparison result and the second comparison result comprises:

when the second comparison result indicates that the pattern of the plurality of touch operations matches with the registered pattern, and the first comparison result indicates that the fingerprint matches with the registered fingerprint, the user is authenticated.

23. The fingerprint sensor of claim 22, wherein the step of determining whether to authenticate the user according to both the first comparison result and the second comparison result comprises:

when the second comparison result indicates that the pattern of the plurality of touch operations does not match with the registered pattern, or the first comparison result indicates that the fingerprint does not match with the registered fingerprint, the user is not authenticated.

24. The fingerprint sensor of claim 22, wherein the step of determining whether to authenticate the user according to both the first comparison result and the second comparison result comprises:
when the second comparison result indicates that the pattern of the plurality of touch operations does not match with the registered pattern, and the first comparison result indicates that the fingerprint matches with the registered fingerprint, the user is determined not to be authenticated.

25. The fingerprint sensor of claim 22, wherein the step of determining whether to authenticate the user according to both the first comparison result and the second comparison result comprises:
when the second comparison result indicates that the pattern of the plurality of touch operations matches with the registered pattern, and the first comparison result indicates that the fingerprint does not match with the registered fingerprint, the user is determined not to be authenticated.

26. The fingerprint sensor of claim 19, wherein the pattern indicates at least one feature, and the at least one feature comprises a number of the plurality of touch operations and at least one of a plurality of touch locations and a plurality of durations corresponding to the plurality of touch operations.

27. The fingerprint sensor of claim 19, wherein the at least one feature further comprises a plurality of slide directions corresponding to a plurality of slide operations and a number of slide direction change between two of the plurality of slide operations.

28. A detection device for use in a detection system capable of user authentication, the detection system comprises a fingerprint sensor comprising a fingerprint sensing array and a memory device for storing a program code for instructing the processing device to perform finger touch authentication and for storing registered data of a user, the registered data comprising a registered pattern and a registered fingerprint, the detection device comprising:
a processing device coupled to the fingerprint sensing array of the fingerprint sensor, and configured to execute a process of finger touch authentication according to a program code stored in the memory device, wherein the process comprises:
obtaining a fingerprint of the user sensed by the fingerprint sensing array of the fingerprint sensor;
obtaining a plurality of touch operations sensed by the fingerprint sensing array of the fingerprint sensor when the fingerprint is sensed by the fingerprint sensing array;
obtaining a pattern of the plurality of touch operations;
comparing the fingerprint with the registered fingerprint stored in the memory device to generate a first comparison result;
comparing the pattern with the registered pattern stored in the memory device to generate a second comparison result; and
controlling an electronic device to perform a corresponding operation according to both the first comparison result and the second comparison result.

29. The detection device of claim 28, wherein the corresponding operation comprises determining whether to authenticate the user.

30. The detection device of claim 29, wherein the corresponding operation further comprises unlocking an operating system of an electronic device or approving an application service when the user is authenticated.

31. The detection device of claim 29, wherein the step of determining whether to authenticate the user according to both the first comparison result and the second comparison result comprises:
when the second comparison result indicates that the pattern of the plurality of touch operations matches with the registered pattern, and the first comparison result indicates that the fingerprint matches with the registered fingerprint, the user is authenticated.

32. The detection device of claim 31, wherein the step of determining whether to authenticate the user according to both the first comparison result and the second comparison result comprises:
when the second comparison result indicates that the pattern of the plurality of touch operations does not match with the registered pattern, or the first comparison result indicates that the fingerprint does not match with the registered fingerprint, the user is not authenticated.

33. The detection device of claim 31, wherein the step of determining whether to authenticate the user according to both the first comparison result and the second comparison result comprises:
when the second comparison result indicates that the pattern of the plurality of touch operations does not match with the registered pattern, and the first comparison result indicates that the fingerprint matches with the registered fingerprint, the user is determined not to be authenticated.

34. The detection device of claim 31, wherein the step of determining whether to authenticate the user according to both the first comparison result and the second comparison result comprises:
when the second comparison result indicates that the pattern of the plurality of touch operations matches with the registered pattern, and the first comparison result indicates that the fingerprint does not match with the registered fingerprint, the user is determined not to be authenticated.

35. The detection device of claim 28, wherein the pattern indicates at least one feature, and the at least one feature comprises a number of the plurality of touch operations and at least one of a plurality of touch locations and a plurality of durations corresponding to the plurality of touch operations.

36. The detection device of claim 28, wherein the at least one feature further comprises a plurality of slide directions corresponding to a plurality of slide operations and a number of slide direction change between two of the plurality of slide operations.

* * * * *